March 7, 1944.　　　J. J. PELLETT　　　2,343,795
EARTH MOVING MACHINE
Filed Feb. 20, 1943　　　2 Sheets-Sheet 1

INVENTOR
J. J. PELLETT
BY
ATTORNEYS

March 7, 1944.  J. J. PELLETT  2,343,795
EARTH MOVING MACHINE
Filed Feb. 20, 1943  2 Sheets-Sheet 2
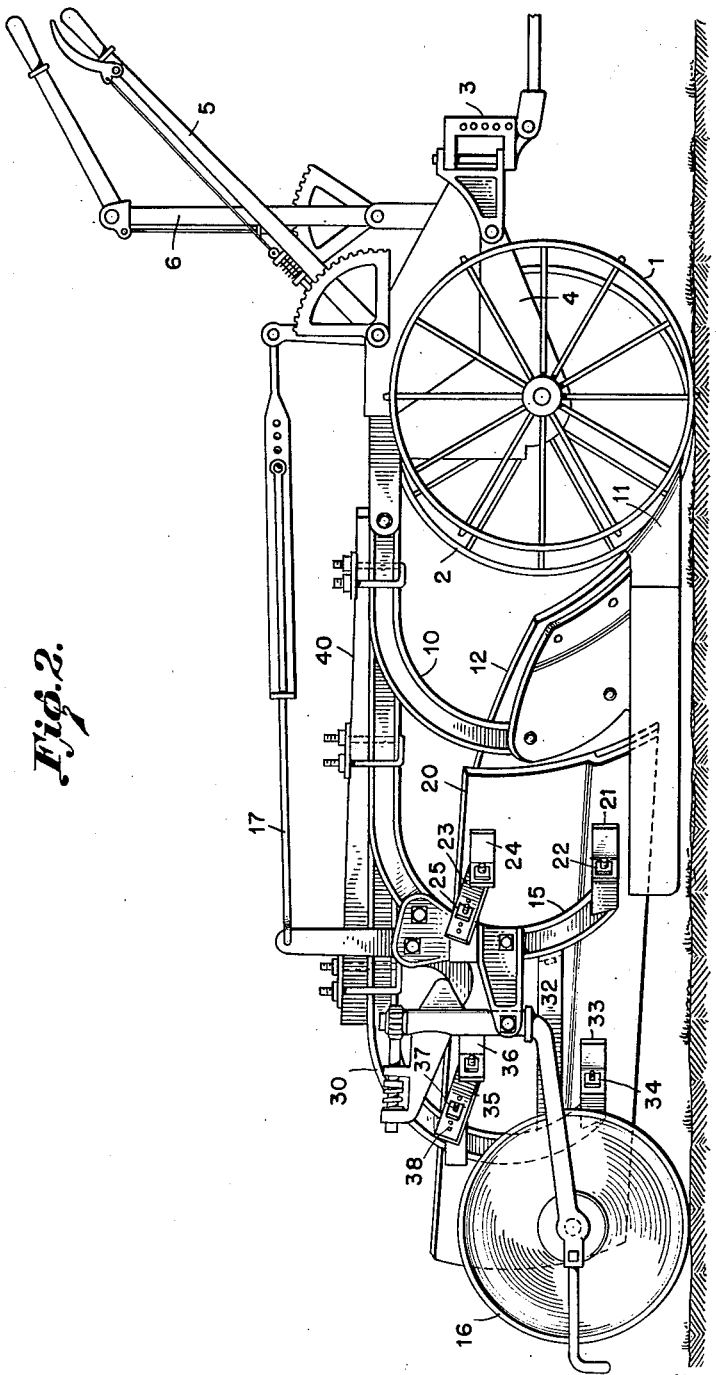
INVENTOR
J. J. PELLETT
BY
ATTORNEYS Patented Mar. 7, 1944

2,343,795

UNITED STATES PATENT OFFICE 2,343,795

EARTH MOVING MACHINE

James J. Pellett, Freehold, N. J., assignor to Claude R. Wickard, as Secretary of Agriculture of the United States of America, and his successors in office Application February 20, 1943, Serial No. 476,524

2 Claims. (Cl. 37—163)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes, without payment to me of any royalty thereon.

This invention relates to earth moving machinery and in particular to a machine suitable for ditching, grading, terracing, etc., and has among its objects the provision of a machine of simple design, light weight, varied uses, large capacity, and one having ease of operation, and such other objects as will be apparent from the following specification and accompanying drawings in which:

Figure 2 is a side elevation of the machine.

Figure 1:
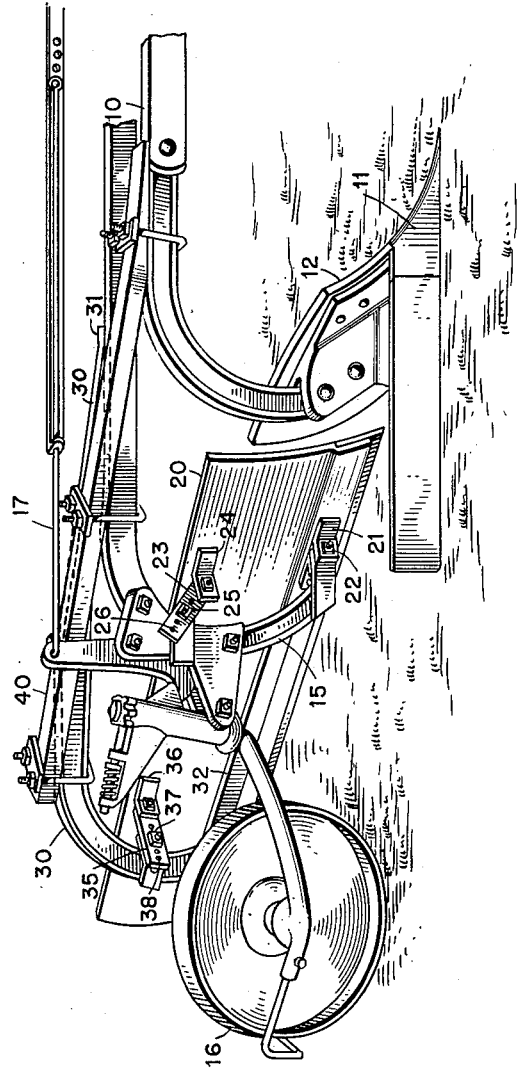
Figure 1 is a fragmentary three-dimentional view.

The machine has many parts corresponding to a conventional plow. These comprise a bull wheel 1 and a side wheel 2 mounted on a suitable framework vertically movable relative to the wheels to which a tractor hitch 3 is coupled. The bull wheel is suitably connected with a conventional power lift mechanism enclosed in a box 4 to elevate the plow from the soil in a well-known manner. Levers 5 and 6 are provided for setting the depth and tilt of the plow in a well known manner.

Beam 10, corresponding to the forward beam of a conventional two-gang plow, is provided in the usual manner with a suction type plowshare 11 to engage the soil and form a furrow. The mold-board 12, instead of being designed as usual to turn the soil over, is shaped merely to elevate and move the dirt to one side.

Beam 15, corresponding to the rearward beam of the plow, has mounted thereon a furrow wheel 16 connected to the lift mechanism through link 17 in the regular manner.

The present invention provides means for conveying the soil laterally of the direction of motion of the machine by a blade 20 set at an angle to the direction of motion of the machine and supported on beam 15, with its forward end positioned immediately behind the mold-board 12. Thus the soil which is raised by the share and mold-board is guided onto the blade and is conveyed to one side by forward movement of the machine.

Blade 20 is supported at its forward end on beam 15 by a bracket 21 and bolt 22 pivotally fixing it to the end of the beam and by a brace rod 23 fixed at one end to the blade by a bracket 24 and adjustably fixed to the beam at its other end by a bolt 25, which may be selectively inserted through one of the series of apertures 26 in the brace rod. The adjustment provides for tilting the top edge of the blade backward to set the blade at any desired angle of inclination with the horizontal.

Blade 20 is supported at its rearward end on an auxiliary beam 30, fixed at one end to beam 15 by a weld 31 and at the other end by a brace 32 welded to both beams 15 and 30 and holding them laterally spaced. The blade is supported on beam 30 by a bracket 33, bolt 34, brace rod 35, bracket 36, bolt 37, and series of apertures 38 corresponding to the similar parts previously described for supporting the front end of the blade on beam 15.

A rigid truss 40 fixed to the three beams 10, 15, and 30 serves to hold the whole beam assembly in rigid position. The beam assembly is carried by the framework of the machine.

In use, blade 20 is lowered until the plowshare 11 engages the soil. Forward movement of the machine causes the plow to be drawn into the soil and the soil from the plow furrow to be conveyed by the mold-board 12 onto the blade and thence laterally to its rearward end. Thus the suction of the plow provides the principal force for holding the machine down and it is not necessary to have a weighted machine as is the usual custom. Furthermore, the soil is delivered onto the blade from the mold-board. The blade can, therefore, be set considerably tilted back at its top edge and the tendency of the blade to ride over the soil and lift the machine from the ground is removed. These factors cause the machine to pull into the soil and make possible a machine of large capacity, that is simple and of light weight, and can be operated by one man with a tractor, thereby accomplishing the purposes of this invention.

Having thus described the invention, what is claimed is:

1. An earth moving machine comprising a forward beam for carrying a suction type plow share, a mold-board mounted on the beam, a rearward beam, an auxiliary beam laterally spaced from the rearward beam, means rigidly fixing all the beams together, and a blade attached to the rearward and auxiliary beams set at an angle to the direction of motion of the machine, one end of the blade being positioned immediately behind the mold-board, whereby soil delivered from the mold-board onto the blade is conveyed laterally of the direction of motion of the machine.

2. The subject-matter of claim 1 characterized in that the blade is adjustably attached to the rearward and auxiliary beams in such manner that its angle of inclination with the horizontal may be varied.

JAMES J. PELLETT.